(12) United States Patent  (10) Patent No.: US 8,686,872 B2
Szczerba et al.  (45) Date of Patent: Apr. 1, 2014

(54) ROADWAY CONDITION WARNING ON FULL WINDSHIELD HEAD-UP DISPLAY

(75) Inventors: Joseph F. Szczerba, Grand Blanc, MI (US); Thomas A. Seder, Northville, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 506 days.

(21) Appl. No.: 12/980,503

(22) Filed: Dec. 29, 2010

(65) Prior Publication Data

US 2012/0169513 A1  Jul. 5, 2012

(51) Int. Cl.
*G08B 21/00* (2006.01)

(52) U.S. Cl.
USPC ............................... 340/905; 340/435; 345/7

(58) Field of Classification Search
USPC ............ 340/425.5, 435, 436, 901–905; 345/7
See application file for complete search history.

(56) References Cited

U.S. PATENT DOCUMENTS

| | | | |
|---|---|---|---|
| 6,986,581 B2 | 1/2006 | Sun et al. | |
| 7,090,355 B2 | 8/2006 | Liu et al. | |
| 7,182,467 B2 | 2/2007 | Liu et al. | |
| 7,213,923 B2 | 5/2007 | Liu et al. | |
| 7,460,951 B2 | 12/2008 | Altan et al. | |
| 7,796,056 B2 * | 9/2010 | Fein et al. | 340/995.24 |
| 8,098,170 B1 | 1/2012 | Szczerba et al. | |
| 8,098,171 B1 | 1/2012 | Szczerba et al. | |
| 2008/0158096 A1 * | 7/2008 | Breed | 345/7 |
| 2008/0158510 A1 | 7/2008 | Tant et al. | |
| 2009/0268946 A1 | 10/2009 | Zhang et al. | |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1 | 10/2010 | Szczerba et al. | |
| 2010/0253593 A1 | 10/2010 | Seder et al. | |
| 2010/0253594 A1 | 10/2010 | Szczerba et al. | |
| 2010/0253595 A1 | 10/2010 | Szczerba et al. | |
| 2010/0253596 A1 | 10/2010 | Szczerba et al. | |
| 2010/0253597 A1 | 10/2010 | Seder et al. | |
| 2010/0253598 A1 | 10/2010 | Szczerba et al. | |
| 2010/0253599 A1 | 10/2010 | Szczerba et al. | |
| 2010/0253600 A1 | 10/2010 | Seder et al. | |
| 2010/0253601 A1 | 10/2010 | Seder et al. | |
| 2010/0253602 A1 | 10/2010 | Szczerba et al. | |
| 2010/0253688 A1 | 10/2010 | Cui et al. | |

(Continued)

OTHER PUBLICATIONS

U.S. Appl. No. 12/467,340, Szczerba, Joseph F.; et al.

(Continued)

*Primary Examiner* — Jeffery Hofsass

(57) ABSTRACT

A substantially transparent windscreen head-up display includes one of light emitting particles or microstructures over a predefined region of the windscreen permitting luminescent display while permitting vision therethrough. A method to dynamically register a graphic onto a driving scene of a vehicle utilizing a substantially transparent windscreen head-up display includes monitoring roadway conditions, identifying a potential roadway hazard based on the roadway conditions, determining the graphic identifying the potential roadway hazard, dynamically registering a location of the graphic upon the substantially transparent windscreen head-up display corresponding to the driving scene of the vehicle, and displaying the graphic upon the substantially transparent windscreen head-up display.

15 Claims, 3 Drawing Sheets

(56) References Cited

U.S. PATENT DOCUMENTS

| | | |
|---|---|---|
| 2010/0253918 A1 | 10/2010 | Szczerba et al. |
| 2010/0254019 A1 | 10/2010 | Cui et al. |
| 2010/0289632 A1 | 11/2010 | Seder et al. |
| 2010/0292886 A1 | 11/2010 | Szczerba et al. |
| 2012/0089273 A1 | 4/2012 | Seder et al. |
| 2012/0169513 A1 | 7/2012 | Szczerba et al. |
| 2012/0169572 A1 | 7/2012 | Seder et al. |
| 2012/0169861 A1 | 7/2012 | Szczerba et al. |
| 2012/0173067 A1 | 7/2012 | Szczerba et al. |
| 2012/0173069 A1 | 7/2012 | Tsimhoni et al. |
| 2012/0174004 A1 | 7/2012 | Seder et al. |

OTHER PUBLICATIONS

U.S. Appl. No. 12/467,350, Seder et al.
U.S. Appl. No. 12/900,566, Szczerba et al.
U.S. Appl. No. 12/900,539, Szczerba et al.
U.S. Appl. No. 12/903,267, Szczerba et al.
U.S. Appl. No. 12/979,432, Szczerba et al.
U.S. Appl. No. 12/980,522, Szczerba et al.
U.S. Appl. No. 12/980,612, Szczerba et al.
U.S. Appl. No. 12/981,206, Szczerba et al.
U.S. Appl. No. 12/981,602, Szczerba et al.
U.S. Appl. No. 12/982,478, Szczerba et al.

* cited by examiner

US 8,686,872 B2

ROADWAY CONDITION WARNING ON FULL WINDSHIELD HEAD-UP DISPLAY

TECHNICAL FIELD

This disclosure is related to graphical imaging representing identification of potential roadway hazards upon a windscreen in a motor vehicle.

BACKGROUND

The statements in this section merely provide background information related to the present disclosure and may not constitute prior art.

Driving capabilities may be enhanced when a vehicle operator is aware of conditions on a roadway that possess potential hazards when the vehicle is traveling along the roadway. The earlier the operator of the vehicle can identify a potential roadway hazard the earlier the operator is able to take precautions to avoid the potential roadway hazard.

Conditions such as ice and potholes along the roadway can be potentially hazardous and go un-noticed by the operator of the vehicle. Identifying potential roadway hazards early can enable the operator of the vehicle to take appropriate precautions to avoid the potential roadway hazards.

Head-up displays project light upon a screen and the light is converted into a viewable display upon the screen. Head-up displays are known to present information to the operator of the vehicle in an effective manner by reducing strain upon the operator while allowing the operator to remain focused on driving.

SUMMARY

A substantially transparent windscreen head-up display includes one of light emitting particles or microstructures over a predefined region of the windscreen permitting luminescent display while permitting vision therethrough. A method to dynamically register a graphic onto a driving scene of a vehicle utilizing a substantially transparent windscreen head-up display includes monitoring roadway conditions, identifying a potential roadway hazard based on the roadway conditions, determining the graphic identifying the potential roadway hazard, dynamically registering a location of the graphic upon the substantially transparent windscreen head-up display corresponding to the driving scene of the vehicle, and displaying the graphic upon the substantially transparent windscreen head-up display.

BRIEF DESCRIPTION OF THE DRAWINGS

One or more embodiments will now be described, by way of example, with reference to the accompanying drawings, in which.

DETAILED DESCRIPTION

Figure 1:
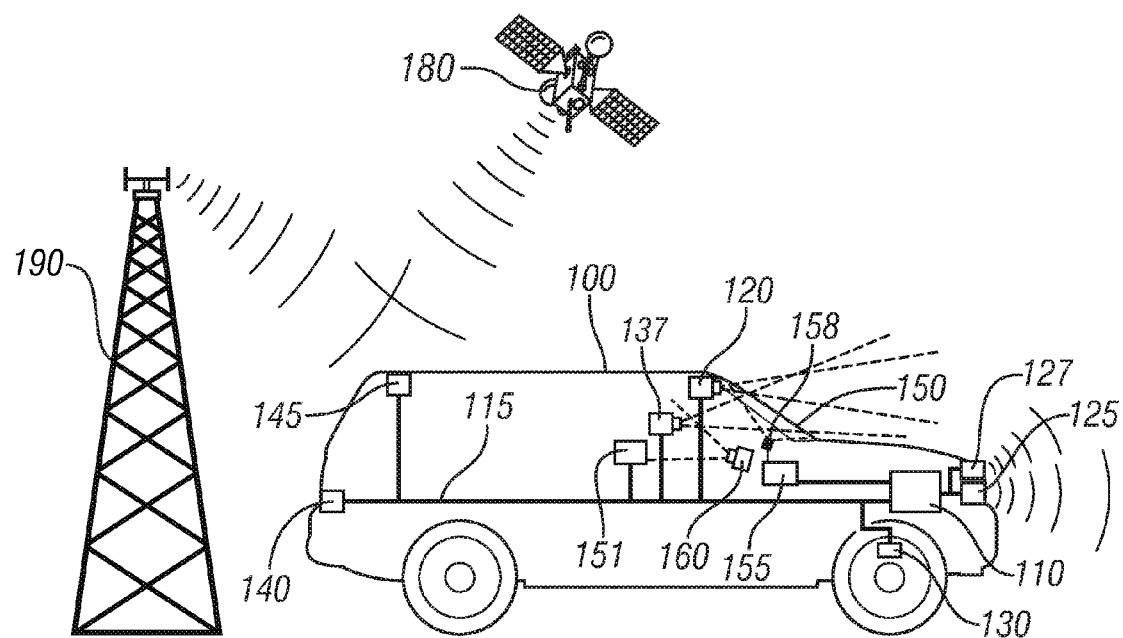
FIG. 1 illustrates an exemplary vehicle equipped with an EVS system, in accordance with the present disclosure.

Referring now to the drawings, wherein the showings are for the purpose of illustrating certain exemplary embodiments only and not for the purpose of limiting the same, a method and an enhanced vision system (EVS) to represent graphical images upon a windscreen of a vehicle identifying a potential roadway hazard is disclosed. The graphical images are derived from sensor and/or data inputs identifying the potential roadway hazard by processing of the inputs in order to convey the identified potential roadway hazard to the operator or occupants of the vehicle. Graphical images to be displayed upon the windscreen are dynamically registered to a location upon the windscreen corresponding to a driving scene of the vehicle, such that an intended operator or occupant of the vehicle may view the other vehicles and the registered graphical image identifying the potential roadway hazard as a single discernable input. Likewise, graphical images representing the potential roadway hazard can by dynamically registered in the same manner as the registered graphical image identifying the potential roadway hazard.

FIG. 1 illustrates an exemplary vehicle equipped with an EVS system, in accordance with the present disclosure. An exemplary EVS system is disclosed in co-pending U.S. application Ser. No. 12/417,077, which is incorporated herein by reference. Vehicle 100 includes an EVS system manager 110; vehicle sensor systems, including camera system 120, lidar system 127, infrared (IR) imaging device 137 and radar system 125; vehicle operation sensors, including vehicle speed sensor 130; information systems, including GPS device 140 and wireless communication system 145; head-up display (HUD) 150; human machine interface (HMI) 151; EVS graphics system 155; graphics projection system 158; and occupant eye location sensing system 160. The EVS system manager 110 includes a programmable processor including programming to monitor various inputs and identify potential roadway hazards to the vehicle 100 to display upon the HUD 150. The EVS system manager 110 can communication directly with various systems and components, or the EVS system manager 110 can alternatively or additionally communicate over a LAN/CAN system 115. The EVS system manager 110 utilizes information regarding the operational environment of the vehicle 100 derived from a number of inputs. Camera system 120 includes a camera or image capturing device taking periodic or sequential images representing a view from the vehicle. The camera or image capturing device of the camera system 120 preferably includes 360 degrees of coverage. Lidar system 127 includes a device known in the art utilizing scattered light to find range and/or other information of other vehicles located near the vehicle. IR imaging device 137 includes a device known in the art utilizing thermal imaging cameras to detect radiation in the infrared range of the electromagnetic spectrum and produce images of that radiation corresponding to other vehicles. Images from the IR imaging device 137 and the camera system 120 can be referred to as image data. Radar system 125 includes a device known in the art utilizing electromagnetic radiation to detect other vehicles or objects located near the vehicle. The radar system 125 and the lidar system 127 can be referred to as range sensors. A number of known in-vehicle sensors are used within a vehicle to monitor vehicle speed, engine speed, wheel slip, and other parameters representative of the operation of the vehicle. Vehicle speed sensor 130 represents one, but the scope of the disclosure includes any such sensors for use by the EVS. GPS device 140 and wireless communication system 145 communicate with resources outside of the vehicle, for example, satellite system 180 and cellular communications tower 190. Data from the internet can be obtained from the wireless communication system 145. GPS device 140 may be utilized in conjunction with a 3D map database including detailed information relating to a global coordinate received by the GPS device 140 regarding the current location of the vehicle. Information from the vehicle sensor systems and the vehicle operation sensors can be utilized by the EVS system manager 110 to monitor the current location and orientation of the vehicle. HUD 150 includes a windscreen equipped with features capable of displaying an image projected thereupon while remaining transparent or substantially transparent such that occupants of the vehicle can clearly observe outside of the vehicle through the windscreen. One will appreciate that while HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. HMI 151 includes a computing device where the operator of the vehicle can input commands to control various systems of the vehicle in signal communication with the HMI 151 and receive desirable information. For instance, utilizing the HMI 151, the operator can input requests to other vehicles (i.e., vehicle to vehicle communication) to help identify potential roadway hazards forward along a roadway. EVS graphics engine 155 includes display software or programming translating requests to display information from the EVS system manager 110 in graphical representations of the information. The EVS graphics engine 155 includes programming to compensate for the curved and tilted surface of the windscreen and any other surfaces onto which graphics are to be projected. EVS graphics engine 155 controls graphics projection system 158 including a laser or projector device producing an excitation light to project the graphical representations. Occupant eye location sensing system 160 includes sensors known in the art to approximate a location of the head of an occupant and further the orientation or gaze location of the eyes of the occupant. Based upon the output of the occupant eye location sensing system 160, the current orientation of the vehicle 100 and input data tracking location information regarding the environment around the vehicle (e.g., identified potential roadway hazards), EVS system manager 110 can accurately dynamically register the graphical representations to the HUD such the occupant sees the images overlaid with visual images through the windscreen.

The EVS described above includes eye sensing and head sensing devices allowing estimation of eye location, allowing dynamic registration of images upon the HUD such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate registration of graphics upon the HUD are contemplated, and the disclosure is not intended to be limited to the particular embodiments described herein.

An exemplary EVS includes a wide field of view, full windscreen HUD, a substantially transparent screen including functionality to display graphical images projected thereupon; a HUD image engine including a laser or lasers capable of projecting images upon the windscreen; input sources deriving data concerning the operating environment of the vehicle; and an EVS system manager including programming to monitor inputs from the input devices, process the inputs and determine critical information relative to the operating environment, and create requests for graphical images to be created by the HUD image engine. However, it will be appreciated that this exemplary EVS is only one of a wide number of configurations that an EVS can take. For example, a vision or camera system is useful to various EVS applications that will be discussed. However, it will be appreciated that an exemplary EVS system can operate without a vision system, for example, providing information available from only a GPS device, 3D map database, and in-vehicle sensors. In the alternative, it will be appreciated that an exemplary EVS system can operate without access to a GPS device or wireless network, instead utilizing inputs only from a vision system and radar system. Many various configurations are possible with the disclosed systems and methods, and the disclosure is not intended to be limited to the exemplary embodiments described herein.

Figure 2:
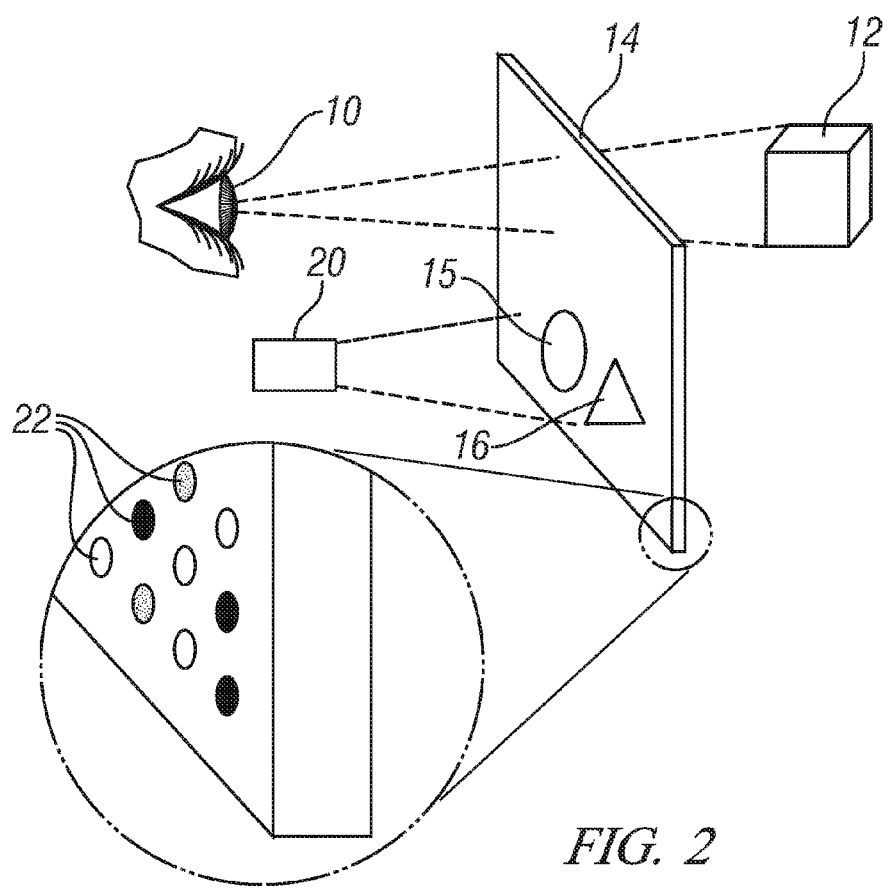
FIG. 2 illustrates a substantially transparent display, in accordance with the present disclosure.

In order to function as a medium through which relevant features are observable while serving as a display device upon which the graphical images may be displayed, the windscreen of the vehicle must be both transparent and capable of displaying images projected by an excitation light source. FIG. 2 illustrates a substantially transparent display, in accordance with the present disclosure. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

FIG. 2 illustrates illumination of substrate 14 illuminated with excitation light (e.g. ultraviolet light or infrared light) from light sources (e.g. a projector or laser), depicted by device 20. The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In one embodiment, the excitation light is output by device 20 including a projector. The projector may be a digital projector. The projector may be a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. The projector is a liquid crystal display (LCD) projector. The projector may be a liquid crystal on silicon (LCOS) projector. The projector may be an analog projector (e.g. a slide film projector or a movie film projector). One of ordinary skill in the art would appreciate other types of projectors which may be used to project ultraviolet light on substrate 14.

In another embodiment, an excitation light is output from device 20, including a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 2 illustrates light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 2 illustrates light emitting material, including light emitting particles 22, dispersed in a substantially transparent substrate. These light emitting particles 22 can be substantially similar particles throughout, or, as illustrated in FIG. 2, the particles can vary in composition. When excitation light is absorbed by the light emitting particles 22, the particles emit visible light. Accordingly, in down-conversion embodiments, when ultraviolet light is absorbed by light emitting particles, visible light is emitted from the light emitting particles. Likewise, in up-conversion embodiments, when infrared light is absorbed by light emitting particles, visible light is emitted from the light emitting particles. Each light emitting particle may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as illustrated in FIG. 2, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. Each of the light emitting particles may have a diameter that is less than about 400 nanometers. According to embodiments, each of the light emitting particles may have a diameter that is less than about 300 nanometers, less than about 200 nanometers, less than about 100 nanometers, or less than about 50 nanometers. The light emitting particles may be individual molecules.

Figure 3:
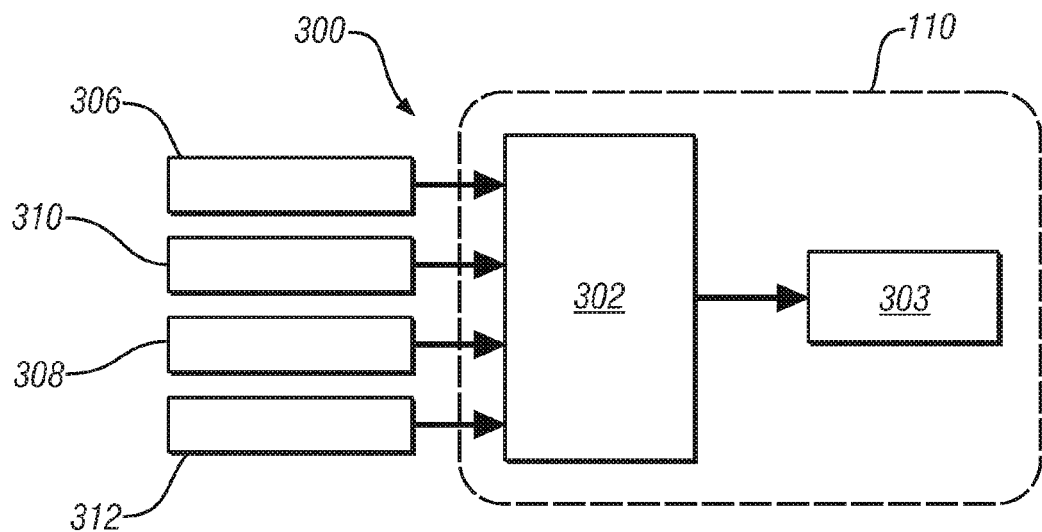
FIG. 3 illustrates an exemplary target tracking system whereby sensor inputs are fused to continuously determine a current location of a remote or target object being tracked, in accordance with the present disclosure.

FIG. 3 schematically illustrates the exemplary target tracking system 300 whereby sensor inputs are fused to continuously determine the current location 303 of a remote or target object being tracked. Inputs related to target objects in an environment around the vehicle are monitored by a data fusion module 302. The data fusion module 302 analyzes, filters, or prioritizes the inputs relative to the reliability of the various inputs, and the prioritized or weighted inputs are summed to determine the current location of the target object.

The data fusion module 302 is useful to integrate input from various sensing devices and generate a fused track of the target object to determine the current location of the target object. The fused track includes a data estimate of relative location and trajectory of the target object relative to the vehicle. This data estimate, based upon range sensors 306 including radar, lidar and other range finding sensor inputs is useful, but includes the inaccuracies and imprecision of the sensor devices utilized to create the track. As described above, different sensor inputs can be utilized in unison to improve accuracy of the estimates involved in determining the current location of the target object (e.g., a potential roadway hazard).

Vision systems provide an additional or alternate source of sensor input for use in the target tracking system 300. Pattern recognition, corner detection, vertical edge detection, vertical object recognition, and other methods may be used in analyzing visual information. However, it will be appreciated that high-resolution visual representations of the field in front a vehicle refreshing at a high rate necessary to appreciate motion in real-time include a very large amount of information to be analyzed. Thus, it is desirable to fuse input from the vision system 308 with range sensors 306 to focus vision analysis upon a portion of the visual information most likely to determine the current location of the target object.

Additional in-vehicle sensors 312 including, providing, for example, infrared and ultrasonic information can be utilized with the data fusion module 302 of the target tracking system 300 to determine the current location 303 of the target object.

Further, vehicle to vehicle information 310 can be utilized to determine the current location 303 of the target object when the target object is another vehicle. When the target object is a second vehicle, the second vehicle communicates its current location to the control system (e.g., EVS system manager 110) of a first vehicle (e.g., the vehicle). The current location communicated by the second vehicle can include the second vehicle providing GPS coordinates in conjunction with 3D map data to the first vehicle. The vehicle to vehicle information 310 can be used alone or can be used in the fusion module 302 with the various sensing devices to generate the fused track of the target object to determine the current location 303 of the target object.

It should further be appreciated that the data fusion module 302 of FIG. 3 can be utilized to continuously monitor the surrounding environment using its range sensors (e.g., radar and lidar), cameras, IR imaging devices and vehicle to vehicle communication to take appropriate counter-measurements in order to avoid incidents or situations to develop into a collision by assessing the input from the sensing devices. An exemplary trajectory fusing process, disclosed in U.S. Pat. No. 7,460,951, and incorporated herein by reference, permits determining position of a target object in the XY-coordinate system relative to the vehicle. Likewise, object tracks can be utilized for a variety of purposes including adaptive cruise control, wherein the vehicle adjusts speed to maintain a minimum distance from vehicles in the current path. Another similar system wherein object tracks can be utilized is a collision preparation system (CPS), wherein identified object tracks are analyzed in order to identify a likely impending or imminent collision based upon the track motion relative to the vehicle. A CPS warns the driver of an impending collision and reduces collision severity by automatic braking if a collision is considered to be unavoidable.

All of the mentioned inputs can be utilized by the exemplary EVS system manager 110. Additionally, it will be appreciated that the EVS system manager 110 may employ to methods described above related to target tracking to determine the current location of the target object, wherein the target object can be an identified potential roadway hazard.

A graphic may be dynamically registered onto a driving scene of a vehicle utilizing a substantially transparent windscreen HUD, wherein the graphic identifies a potential roadway hazard. Dynamically registering the graphic onto the driving scene of the vehicle requires monitoring data related to an occupant eye location (and/or head location), monitoring a current orientation of the vehicle, monitoring a current location of the vehicle and monitoring a current location of a target object (e.g., the identified potential roadway hazard). With reference to FIGS. 1 and 3, the occupant eye location sensing system 160 includes sensors known in the art to approximate a location of the head of an occupant and further the orientation or gaze location of the eyes of the occupant. An occupant can be an operator of the vehicle or a passenger within the vehicle. Head and eye sensing devices are known in the art and will not be discussed in great detail here. For the purposes of this disclosure, a camera based device is utilized in combination with image recognition software to estimate a three-dimensional head location within the vehicle, able to be coordinated with a vehicle coordinate system, and a direction of occupant's gaze based upon image recognition programming.

The current orientation of the vehicle can be determined by methods known in the art such as, but not limited to, monitoring the GPS device 140 in conjunction with a 3D map database and a digital compass including detailed information relating to a global coordinate received by the GPS device 140 regarding the current orientation of the vehicle. The current orientation can also be determined by vehicle kinematics including at least vehicle speed and yaw rate, available through sensors monitoring vehicle operation and/or monitoring accelerometer readings.

The current location of the target object can be monitored by analyzing the data obtained by the target tracking system 300 described above, where one or more sensors are used in conjunction with each other to monitor the current location of the target object. For instance, vehicle sensor systems, including camera system 120 and radar system 125 can fuse collected information to monitor the current location of the target object. Likewise, vehicle to vehicle communication can be utilized where the target object is a second vehicle that continuously conveys its current location back to the vehicle (e.g., conveys GPS information in conjunction with 3D map data).

Based on the occupant eye location, the current orientation of the vehicle and the current location of the target object (e.g., the identified social networking subscribers), an estimated point of intersection between the tracked object (e.g., the identified potential roadway hazard) and the operator's eyes can be determined upon the windscreen, thereby enabling graphical images to be dynamically registered to a location upon the windscreen corresponding to the driving scene of the vehicle, such that the occupant of the vehicle may view the identified potential roadway hazard and the registered graphical image identifying the potential roadway hazard as a single discernable input.

It will be further appreciated that the dynamically registered graphics can be updated based upon the occupant's gaze location. As will be described in more detail below with specific examples, emphasis to the registered graphic can be enhanced or decreased based on the distance between the occupant's gaze location and the identified potential roadway hazard on the driving scene. For instance, as occupant's gaze location from the dynamically registered graphic increases, emphasis may be added to the graphic to gain the occupant's attention because it is evident the occupant is looking away from the graphic. However, if the occupant's gaze location from the graphic decreases, emphasis may be reduced to the graphic because it is evident the occupant is looking at or near the graphic. Likewise, if the graphic is textual in nature, as the occupant's gaze location decreases emphasis may be added to the textual graphic to clarify the text because it is evident the occupant is looking at the graphic and attempting to read the text. Emphasis can include increasing or decreasing illumination of the graphic and/or flashing or pulsating the graphic. Additionally the location of the graphic can be dynamically updated by increasing or reducing emphasis to the graphic based on a decreasing distance between the current location of the vehicle and the current location of the identified potential roadway hazard. For example, as a vehicle approaches black ice that is identified as a potential roadway hazard, the graphic identifying and locating the black ice may be enhanced as the current location between the vehicle and the black ice decreases.

Figure 4:
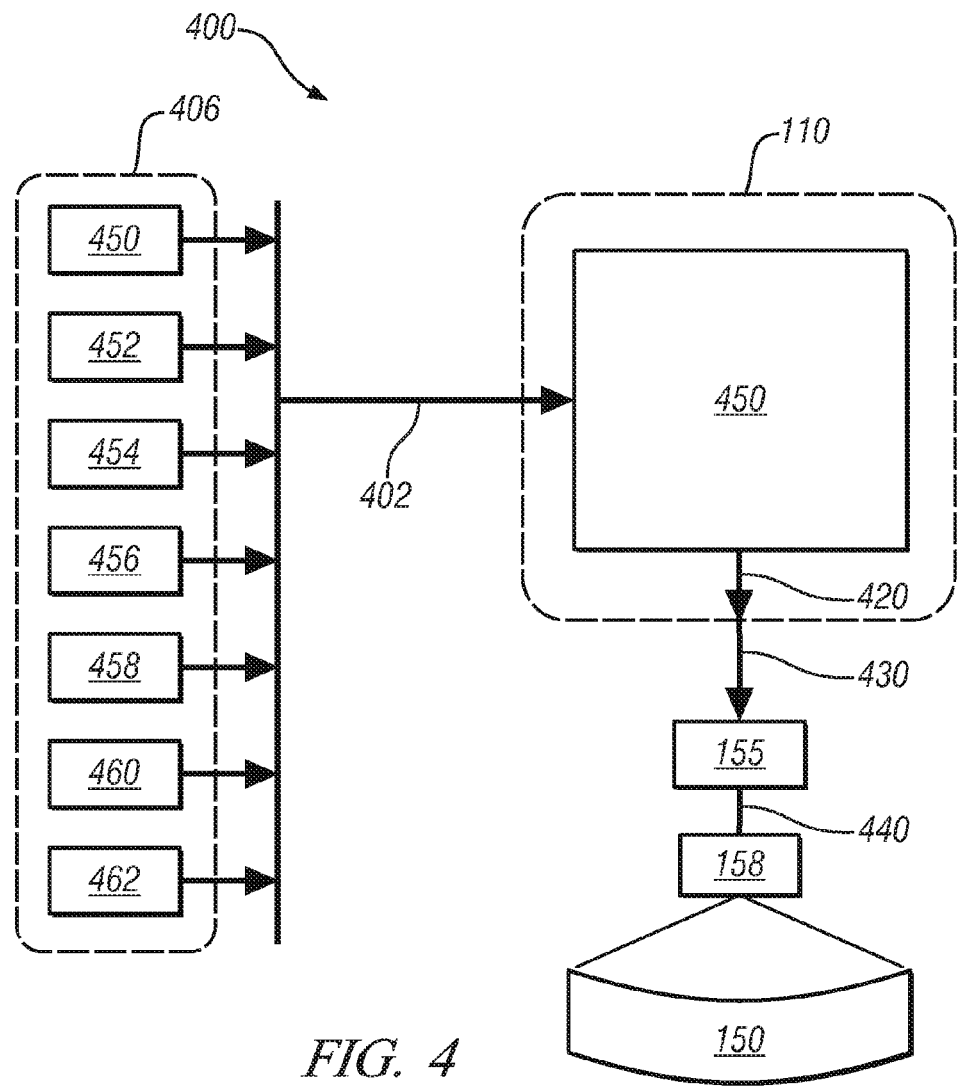
FIG. 4 illustrates an exemplary control scheme 400 to identify and locate potential roadway hazards to the vehicle in a vehicular environment relative to the vehicle, in accordance with the present disclosure.

Referring to FIG. 4, an illustration of an exemplary control scheme 400 to identify and locate potential roadway hazards to the vehicle in a vehicular environment relative to the vehicle is illustrated in accordance with the present disclosure. A potential roadway hazard module (PRHM) 450 associated with the EVS system manager 110 analyzes sensor and data inputs 402 utilized by the PRHM 450 to identify and locate potential roadway hazards 420. The PRHM 450 utilizes the sensor and data inputs 402 from a plurality of vehicle sensors and data modules 406 to monitor the vehicular environment. It should be appreciated that each of the plurality of vehicle sensors and data modules 406 can be utilized alone or in unison with other sensors and data modules depending on the application in monitoring the vehicular environment to generate the sensor and data inputs 402 utilized by the PRHM 450 to identify the potential roadway hazards 420. The plurality of vehicle sensors and data modules 406 can include data from a lidar module 450, data from a radar module 452, data from an IR imaging module 454, vehicle to vehicle information 456, data from a camera module 458 capable of capturing images with 360 degrees of rotation, data from a wireless communications module 460 and data from a vehicle history module (VHM) 462. Radar and lidar data can be referred to as range data from the radar system 125 and the lidar system 127 of FIG. 1, respectively. Likewise IR imaging data and camera data can be referred to as image data from the camera system 120 and the IR imaging device 137 of FIG. 1, respectively. The wireless communications module 460 can include data from the wireless communication system 145 that includes the internet, GPS data in conjunction with 3D map data, the cellular communications 190 and the satellite system 180. However, this disclosure is not limited to these sensors and data modules. The vehicle to vehicle information 456, also referred to as vehicle to vehicle communication, includes utilizing GPS and 3D map data, the wireless communication system 145, the satellite system 180 and the cellular communications tower 190. The VHM 462 includes previously traveled routes by the vehicle and potential roadway hazards identified along the previously traveled routes, wherein the identity and location of the potential roadway hazards are recorded and stored in memory.

Control system 400 further includes the EVS system manager 110 monitoring information from the PRHM 450 and generating display requirements 430 based on the identified potential roadway hazards 420 generated by the PRHM 450, EVS graphics system 155 monitoring the display requirements 430 from the EVS system manager 110 and generating graphics commands 440, and a graphics projection system 158 projecting light upon a head-up display 150.

Potential roadway hazards 420 can include any object, obstacle or condition that may be potentially hazardous to a vehicle traveling along the roadway. For instance, potential roadway hazards can include potholes, black ice, ice, gravel, wet sections, sections of road susceptible to potentially hazardous conditions during adverse weather conditions, items on the roadway, disabled vehicles and vehicles hidden in driveways. However, potential roadway hazards are not limited to these hazards, and are appreciated to include any condition or hazard that can cause potential harm to a vehicle, or threaten the safety of an operator of the vehicle, traveling along a roadway.

Embodiments envisioned include utilizing the plurality of vehicle sensors and data modules 406 to monitor a vehicular environment relative to the vehicle. Based on the sensor and data inputs 402 the PRHM 450 can identify the potential roadway hazards 420, wherein the EVS graphics system 155 determines the graphic identifying the roadway hazard and a location of the graphic is dynamically registered upon the substantially transparent windscreen head-up display corresponding to the driving scene. The graphics projection system 158 displays the graphic onto the driving scene of the vehicle utilizing the head-up display.

Monitoring roadway conditions can be based upon the vehicle to vehicle information 456 (i.e., vehicle to vehicle communication). For instance, a request for potential roadway hazards forward in a roadway can be requested by the vehicle to a second vehicle forward in the roadway. The request can be made by the operator of the vehicle utilizing the HMI 141 and communicated utilizing any of the systems discussed above. The location and identity of the potential roadway hazard can be transferred from the second vehicle to the vehicle. It is appreciated that the second vehicle identifies the potential roadway hazard and transfers the identity of the potential roadway hazard to the vehicle in response to the request by the vehicle. It is further appreciated that an operator of the vehicle can configure the vehicle to vehicle information 456 to automatically and continuously make requests to other vehicles (e.g., second vehicle) forward in the roadway to identify and locate potential roadway hazards. Vehicle to vehicle information advantageously identifies potential roadway hazards early when other sensors and data modules may be unavailable, out of range or less preferred. Based on the vehicle to vehicle information, the PRHM 450 can identify the potential roadway hazard 420, wherein the EVS graphics system 155 determines the graphic identifying the potential roadway hazard and a location of the graphic is dynamically registered upon the substantially transparent windscreen head-up display corresponding to the driving scene. Additionally, the second vehicle can transmit a message identifying the potential roadway hazard, wherein the EVS graphics system 155 determines a textual graphic translating the message identifying the potential roadway hazard.

Monitoring vehicle to vehicle information of the vehicle to vehicle information module 456 can further include analyzing a drivability state of a second vehicle transmitted within the vehicle to vehicle information. For instance, the vehicle to vehicle module 456 can monitor if the second vehicle is slipping, wherein in-vehicle sensors of the second vehicle determine that the second vehicle is slipping. An adverse driving state can be detected based upon analyzing the driving state of the second vehicle, i.e., the vehicle is slipping. A location of the detected adverse driving state can be identified, wherein the location can be transmitted within the vehicle to vehicle information. The PRHM 450 can thereby identify the potential roadway hazard 420 based on the identified location of the detected adverse driving state. In a non-limiting example, the vehicle to vehicle information can determine that the second vehicle is slipping due to black ice on the road, wherein the location of where the second vehicle is slipping is identified by the PRHM 450 as the location of an identified potential roadway hazard due to the black ice. The EVS graphics system 155 can determine a registered graphic identifying the black ice as the potential roadway hazard, wherein the location of the registered graphic can be dynamically registered upon the substantially transparent windscreen head-up display corresponding to the driving scene of the vehicle. In a non-limiting example, the registered graphic can include a warning such as an exclamation point. Additionally, the EVS graphics system 155 can determine a textual graphic identifying the black ice as the potential roadway hazard.

In another exemplary embodiment, roadway conditions can be monitored utilizing data from range sensors that can include data from the lidar module 450 and data from the radar module 452, wherein the PRHM 450 can identify a potential roadway hazard based on the data from the range sensors. For instance, the radar system 125 of FIG. 1 can be utilized to detect objects that may be potentially hazardous. For example, it can be determined that a vehicle along the roadway is inoperable due to the range sensors determining that the range is drastically decreasing. Likewise, in another non-limiting example, range sensors can identify a vehicle hidden in a driveway that would not be identifiable using image data from the camera system 120. The EVS graphics system 155 can determine a graphic identifying the hidden vehicle as the potential roadway hazard, wherein the location of the graphic can be dynamically registered upon the substantially transparent windscreen head-up display corresponding to the driving scene of the vehicle. In a non-limiting example, the graphic can include a highlighted outline graphic encompassing the hidden vehicle.

In another exemplary embodiment, the potential roadway hazard can be identified by the PRHM 450 utilizing sensor and data inputs 402 that can include image data from the IR imaging module 454 and data from the camera module 458. For instance, the camera module 458 can include data monitored by the camera system 120 that includes images identified as potholes along the roadway, wherein the PRHM 450 can identify the potholes as potential roadway hazards. It is further appreciated, that the PRHM 450 can include monitoring additional data such as the lane in which the vehicle is traveling and the lane in which the pothole is monitored by the camera module 458 where the degree of threat possessed by the pothole is increased/decreased based on the relation to the lane in which the vehicle is traveling and the monitored lane of the pothole.

In another exemplary embodiment, the potential roadway hazard can be identified by the PRHM 450 utilizing data from the wireless communications module 460. As aforementioned, the data from the wireless communications module 460 can include monitoring data from the wireless communication system 145 including the internet, GPS data in conjunction with 3D map data, the cellular communications 190 and the satellite system 180. In a non-limiting example, the satellite system 180 may determine rock debris from a landslide and wirelessly communicate this information via the wireless communication module 460 to the PRHM 450 to identify the rock debris as a potential roadway hazard.

In another non-limiting example a planned route of the vehicle can be monitored, wherein weather conditions along the planned route are monitored utilizing GPS data in conjunction with 3D map data and the internet via the wireless communication module 460. The PRHM 450 can be configured to monitor road sections along the planned route susceptible to potential hazardous conditions during adverse weather conditions, wherein such road sections are identified as potential roadway hazards when the monitored weather conditions are adverse. In a non-limiting example, an overpass may be identified as a potential hazardous condition when it is cold out because of the increased risk of ice forming on the overpass, but otherwise, the overpass would not be identified as a potential hazardous condition. In another non-limiting example, a steep road section on a mountainous pass can be identified as a potential roadway hazard when it is snowing. The EVS graphics system 155 can determine a graphic identifying the steep road section on the mountainous pass as the potential roadway hazard when it is snowing, wherein the location of the graphic can be dynamically registered upon the substantially transparent windscreen head-up display corresponding to the driving scene of the vehicle. In a non-limiting example, the graphic can include utilizing a highlighted graphic overlaying the identified steep road section as the potential roadway hazard.

In another exemplary embodiment, the potential roadway hazard can be identified by the PRHM 450 utilizing data from the VHM 462. As aforementioned, the VHM 462 includes monitoring previously traveled routes by the vehicle and recorded hazards identified along the previously traveled routes, wherein the identity and location of the recorded hazards are stored in memory. Specifically, a current route traveled by the vehicle is monitored. The current route can be monitored based on points of interest inputs to the HMI 151 for navigational purposes. Additionally, the current route can be monitored based upon current GPS information in conjunction with 3D map data. Previously recorded hazards along a substantially similar route previously traveled by the vehicle are monitored. The current route traveled by the vehicle is compared and cross-referenced to the recorded hazards along the substantially similar route previously traveled by the vehicle. The PRHM 450 thereby identifies the potential roadway hazard when hazards previously recorded are approaching or may soon be approaching along the current route traveled by the vehicle based on comparing and cross-referencing the current route to the substantially similar route. In a non-limiting example, a motorist traveling to work may identify gravel over an intersection on a ride to work. The gravel can be a recorded hazard stored in memory or a database. The following morning, the gravel over the intersection can be identified as the potential roadway hazard prior to the motorist approaching the gravel based on comparing and cross-referencing the recorded hazard stored in the memory or the database.

Figure 5:
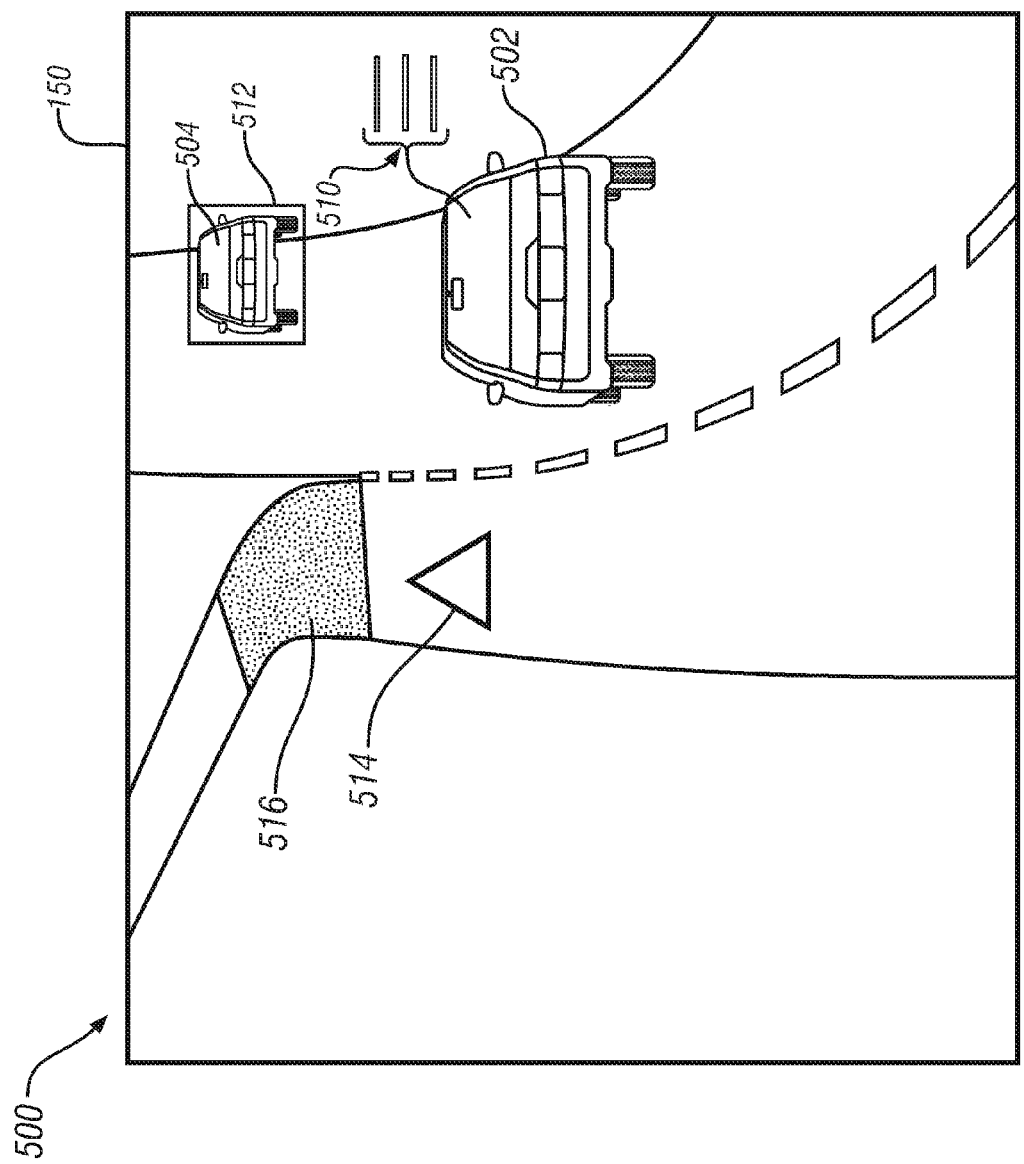
FIG. 5 illustrates a driving scene including graphics dynamically registered upon a substantially transparent windscreen head-up display of a vehicle, in accordance with the present disclosure.

Referring to FIG. 5, a driving scene 500 is illustrated through a substantially transparent windscreen head-up display 150 of a vehicle. An SUV 502 can be viewed through the windscreen head-up display 150, wherein the vehicle and SUV 502 can communicate via vehicle to vehicle information (i.e., vehicle to vehicle communication). Textual graphic 510 is dynamically registered upon the head-up display 150 and translates a message from the SUV 502 identifying black ice on which the SUV 502 is travelling over and that it may be a potential roadway hazard. Highlighted box graphic 512 encompasses an immobilized vehicle 504 that may be identified as a potential roadway hazard by the PRHM 450 of FIG. 4. Registered graphic 514 identifies and describes a pothole in the lane of travel of the vehicle as a potential roadway hazard. Highlighted graphic 516 overlays a section of road identified as a potential roadway hazard. It is appreciated that the section of road is a sharp turn that may only be susceptible to hazardous conditions when adverse weather conditions are monitored such as rain or snow.

Further embodiments envisioned include dynamically updating and augmenting graphics identifying potential roadway hazards based on a degree of threat of the potential roadway hazard and the distance between the vehicle and the identified potential roadway hazard. The degree of threat of the potential roadway hazard can be based on comparing the potential roadway hazard to threshold conditions. For instance, the registered graphic 514 identifying the pothole may be compared to threshold conditions, where any potholes exceeding a threshold diameter pose a higher degree of threat than potholes not exceeding the threshold diameter. Hence, the registered graphic 514 may be dynamically augmented to change color or illumination intensity as the vehicle approaches the pothole because the degree of threat is high enough to disrupt the operation of the vehicle. In another non-limiting example, the highlighted box graphic 512 encompassing the immobilized vehicle 504 can be dynamically augmented to pulsate as the distance between the vehicle and the immobilized vehicle decreases. In other words, the highlighted box graphic 512 may be dynamically updated based upon a decreasing distance between the current location of the vehicle and the current location of the identified potential roadway hazard (e.g., the immobilized vehicle). Likewise, if it is determined that the vehicle is not traveling in the same lane as the immobilized vehicle 504, the degree of threat of the immobilized vehicle 504 may not be as high of a threat if the vehicle were traveling in the same lane as the immobilized vehicle 504. As aforementioned, emphasis to graphics can be additionally enhanced or decreased based on the distance between the occupant's gaze location and the identified potential roadway hazard on the driving scene.

The above disclosure describes a substantially transparent head-up display capable of full-screen display. It will be appreciated that similar methods can be employed upon windscreens utilizing a substantially full-windscreen display, a partial windscreen display, for example limited to the driver's half of the windscreen, or a display focused or limited to the straight-forward typical center of view of the operator. The disclosure is not limited to windscreens, but can include substantially transparent head-up displays that include side windows or a rear window of a vehicle. Graphics can additionally be projected upon pillars of the vehicle. Many embodiments of displays are envisioned, and the disclosure is not intended to be limited to the particular exemplary embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to dynamically register a graphic onto a driving scene of a vehicle utilizing a substantially transparent windscreen head-up display, comprising:
    monitoring roadway conditions;
    identifying a potential roadway hazard based on the roadway conditions;
    monitoring an occupant eye location;
    monitoring a current orientation of the vehicle and monitoring a current location of the identified potential roadway hazard;

determining the graphic identifying the potential roadway hazard;

dynamically registering a location of the graphic upon the substantially transparent windscreen head-up display corresponding to the driving scene of the vehicle; and displaying the graphic upon the substantially transparent windscreen head-up display based upon the occupant eye location, the current orientation of the vehicle and the current location of the identified potential roadway hazard;

wherein the substantially transparent windscreen head-up display comprises one of light emitting particles or microstructures over a predefined region of the windscreen permitting luminescent display while permitting vision therethrough.

2. The method of claim 1 further comprising monitoring an operator gaze location; and wherein dynamically registering the location of the graphic upon the substantially transparent windscreen head-up display corresponding to the driving scene of the vehicle further comprises adding emphasis to the graphic based on an increasing distance between the operator gaze location and the current location of the identified potential roadway hazard.

3. The method of claim 1 further comprising monitoring a current location of the vehicle; and wherein dynamically registering the location of the graphic upon the substantially transparent windscreen head-up display corresponding to the driving scene of the vehicle further comprises adding emphasis to the graphic based on a decreasing distance between the current location of the vehicle and the current location of the identified potential roadway hazard.

4. The method of claim 1 further comprising monitoring a vehicle to vehicle communication; and wherein monitoring roadway conditions is based upon the vehicle to vehicle communication.

5. The method of claim 4 further comprising monitoring a request for potential roadway hazards ahead of the vehicle;

wherein the vehicle to vehicle communication comprises:
conveying the request for the potential roadway hazards to a second vehicle ahead of the vehicle; and
transferring a location and an identity of the potential roadway hazard from the second vehicle to the vehicle.

6. The method of claim 4 wherein monitoring roadway conditions comprises:
analyzing a drivability state of a second vehicle, the drivability state transmitted within the vehicle to vehicle communication;
detecting an adverse driving state based on the analyzed driving state of the second vehicle;
identifying a location of the detected adverse driving state, the location transmitted within the vehicle to vehicle communication; and
wherein identifying the potential roadway hazard is based on the location of the adverse driving state.

7. The method of claim 1 further comprising monitoring range data from range sensors;
wherein monitoring roadway conditions is based upon the range data from range sensors; and
wherein identifying the potential roadway hazard utilizes the range data from the range sensors to identify the potential roadway hazard.

8. The method of claim 1 further comprising monitoring image data;
wherein monitoring roadway conditions is based upon the image data; and
wherein identifying the potential roadway hazard utilizes the image data to identify the potential roadway hazard.

9. The method of claim 1 further comprising monitoring data from wireless communications;
wherein monitoring roadway conditions is based upon the data from wireless communications; and
wherein identifying the potential roadway hazard utilizes the data from the wireless communications to identify the potential roadway hazard.

10. The method of claim 1 further comprising monitoring vehicle travel history, comprising:
monitoring a current route traveled by the vehicle;
monitoring recorded hazards along a substantially similar route previously traveled by the vehicle; and
comparing and cross-referencing the current route traveled by the vehicle to the recorded hazards along the substantially similar route previously traveled by the vehicle;
wherein monitoring roadway conditions is based upon the vehicle travel history.

11. The method of claim 1 wherein monitoring roadway conditions comprises:
monitoring a planned route of the vehicle; and
monitoring weather conditions along the planned route of the vehicle;
wherein identifying the potential roadway hazard based on the monitored roadway conditions comprises identifying a section of road along the planned route of the vehicle susceptible to a potential hazardous condition as the potential roadway hazard when the monitored weather conditions are adverse weather conditions.

12. The method of claim 11 wherein determining the graphic identifying the potential roadway hazard comprises utilizing a highlighted graphic overlaying the section of road identified as the potential roadway hazard.

13. The method of claim 1 wherein determining the graphic identifying the potential roadway hazard comprises utilizing a highlighted box encompassing the identified potential roadway hazard.

14. Method to dynamically register a highlighted outline graphic onto a driving scene of a vehicle utilizing a substantially transparent windscreen head-up display, comprising:
monitoring roadway conditions;
identifying a potential roadway hazard based on the monitored roadway conditions;
monitoring an occupant eye location;
monitoring an occupant gaze location;
monitoring a current orientation of the vehicle;
monitoring a current location of the identified potential roadway hazard;
dynamically registering a location of the highlighted outline graphic upon the substantially transparent windscreen head-up display corresponding to the driving scene of the vehicle and based upon the occupant eye location, the occupant gaze location, the current orientation of the vehicle and the current location of the detected potential roadway hazard;
displaying the highlighted outline graphic upon the substantially transparent windscreen head-up display; and
wherein the substantially transparent windscreen head-up display comprises one of light emitting particles or microstructures over a predefined region of the windscreen permitting luminescent display while permitting vision therethrough.

15. The method of claim 14 further comprising:
  determining a degree of threat possessed by the identified potential roadway hazard;
  monitoring a distance between the vehicle and the identified potential roadway hazard; and
  dynamically augmenting the highlighted outline graphic based on the degree of threat and the distance between the vehicle and the identified potential roadway hazard.

* * * * *